(12) United States Patent
Dingler et al.

(10) Patent No.: US 7,374,036 B2
(45) Date of Patent: May 20, 2008

(54) ROLLER CONVEYOR

(75) Inventors: Guenther Dingler, Ostelsheim (DE); Werner Swoboda, Boeblingen (DE); Erwin Gross, Deckenpfronn (DE)

(73) Assignee: Eisenmann Anlagenbau GmbH & Co. KG, Boeblingen (DE)

( * ) Notice: Subject to any disclaimer, the term of this patent is extended or adjusted under 35 U.S.C. 154(b) by 0 days.

(21) Appl. No.: 11/701,169

(22) Filed: Feb. 1, 2007

(65) Prior Publication Data

US 2007/0181407 A1    Aug. 9, 2007

(30) Foreign Application Priority Data

Feb. 8, 2006   (DE) ...................... 10 2006 005 983

(51) Int. Cl.
*B65G 13/06*   (2006.01)

(52) U.S. Cl. ...................... 198/788; 198/789

(58) Field of Classification Search ................ 198/788, 198/789, 780, 781.06; 193/35 R
See application file for complete search history.

(56) References Cited

U.S. PATENT DOCUMENTS

| | | | |
|---|---|---|---|
| 3,857,473 A | 12/1974 | Kornylak | |
| 4,248,341 A | 2/1981 | Schuck et al. | |
| 4,645,056 A | 2/1987 | Palazzolo et al. | |
| 6,244,427 B1 * | 6/2001 | Syverson | 198/788 |
| 6,450,325 B1 * | 9/2002 | Devnani | 198/788 |
| 2001/0027909 A1 * | 10/2001 | Itoh et al. | 198/788 |
| 2004/0035684 A1 * | 2/2004 | Fukuoka | 198/788 |

FOREIGN PATENT DOCUMENTS

| | | |
|---|---|---|
| DE | 2124289 | 5/1971 |
| DE | 2245952 | 3/1973 |
| DE | 2328206 | 1/1974 |
| DE | 60002027 | 2/2004 |
| EP | 1107443 | 6/2001 |
| EP | 1510477 | 3/2005 |

OTHER PUBLICATIONS

German Office Action.

* cited by examiner

*Primary Examiner*—James R Bidwell
(74) *Attorney, Agent, or Firm*—Factor & Lake, Ltd.

(57) ABSTRACT

A roller conveyor including a plurality of driven rollers disposed in two parallel tracks. With each driven roller a separate drive motor is associated, which takes the form of a low voltage motor. The drive motors are supplied from at least one low voltage source. They are preferably hub motors, which are operated with direct current. By virtue of the low voltage technology, less expensive components may be used and the safety requirements may be reduced.

16 Claims, 3 Drawing Sheets

ROLLER CONVEYOR

RELATED APPLICATIONS

The present invention claims the benefit of the filing date of German Patent Application, Serial No. 10 2006 005 983.2, filed Feb. 8, 2006; the content of which is incorporated by reference herein.

This application also relates to concurrently filed U.S. patent application Ser. Nos. 11/701,175, entitled ROLLER CONVEYOR; and, 11/701,176, entitled SET OF ROLLER CONVEYORS.

TECHNICAL FIELD

The invention relates to a roller conveyor comprising a plurality of driven rollers disposed in two parallel tracks; a plurality of drive motors for driving the rollers; and, at least one voltage source, from which the drive motors are supplied.

BACKGROUND OF THE INVENTION

Roller conveyors are used to transport goods carriers such as e.g. pallets. In the automobile industry they are often used to transfer vehicle bodies or parts of vehicle bodies between individual processing stations. The vehicle bodies are in said case fastened on so-called skids. This term is used for transport racks that have two mutually parallel skid runners. During the conveying operation the skid runners rest on rollers of the roller conveyor, which are disposed successively in conveying direction along two tracks. When the rollers are set in rotation, the skid with the vehicle body fastened thereon is fed in conveying direction, wherein it is sufficient to provide only some of the rollers with a rotary drive.

Known roller conveyors of the initially described type, such as are currently known from the market, are composed of individual roller conveyor modules, which contain a plurality of driven rollers and in each case a single electric drive motor. The drive motor is disposed as a rule between the two parallel tracks, which are composed of roller rails, in which the rollers are accommodated. Mostly, the torque generated by the drive motor is distributed by belts to the driven rollers of one of the two roller rails. These rollers are connected by axles rigidly to the rollers on the other roller rail.

In these known roller conveyors, therefore, the number of drive motors is lower than the number of driven rollers.

The voltage used to operate the drive motors is identical to the system voltage that is available in each case and is therefore generally between approximately 200 V and approximately 600 V. Because of the relatively high operating voltage it is necessary to take considerable safety measures, this being associated with costs. Costs are further increased by the fact that the semiconductor components, to which the high operating voltage is to be applied, are relatively expensive and have a relatively high loss factor.

The present invention is provided to solve these and other problems.

SUMMARY OF THE INVENTION

An object of the present invention is to provide a roller conveyor of the initially described type, which as a whole costs less to manufacture and operate. This object is achieved according to the invention in that: with each driven roller a drive motor is associated; the drive motors take the form of low voltage motors; and, the at least one voltage source takes the form of a low voltage source.

The concept according to the present invention of a roller conveyor not only avoids cumbersome belt drives or other transmission mechanisms by associating a separate drive motor with each driven roller. The use of a plurality of drive motors, which each individually have a relatively low power consumption, moreover opens up the possibility of using low voltage motors without the current that is to be supplied to each drive motor becoming excessively high. Since low operating voltages do not call for such stringent safety measures, cost benefits accrue. Semiconductor components, to which only low operating voltages are applied, moreover have smaller losses and therefore also require less cooling. Finally, the printed-circuit boards, on which the control circuits are assembled, may be equipped with smaller interspaces between conductors, thereby reducing the size of these printed-circuit boards and making it easier to integrate these printed-circuit boards e.g. directly with the drive motors in a sub-assembly.

The low voltage source should supply a voltage of at most 60 V. In this voltage range, the previously indicated advantages of low voltage technology are still adequately achieved. It is preferred that the low voltage source supplies a voltage of approximately 48 V. Also advantageous is a voltage of approximately 24 V. The reason for this is that many standard circuit components are designed for such an operating voltage.

It is particularly preferred when the low voltage motors are d.c. motors and the low voltage source is a direct current source. In this case, it is possible for some of the driven rollers to be operated in a "braking" mode, in which they act as generators and generate electric current.

Particularly small sub-assemblies of rollers and drive motors are obtained when the low voltage motors are hub motors.

These and other objects and advantages will be made apparent from the following brief description of the drawings and the detailed description of the invention.

DETAILED DESCRIPTION OF THE INVENTION

Figure 1:
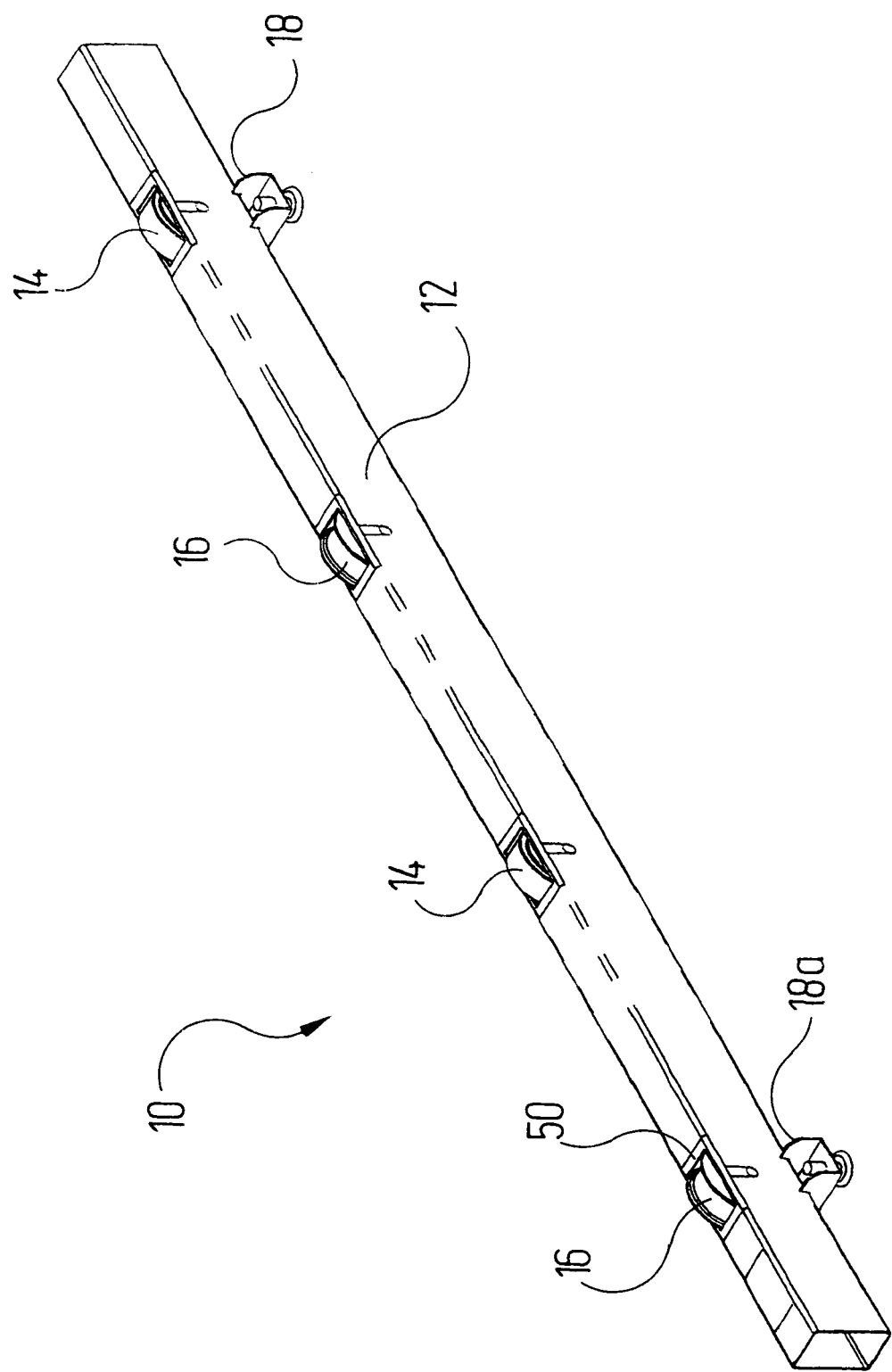
FIG. 1 is a perspective view of a roller rail forming part of a roller conveyor of the present invention.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Reference is made first to FIG. 1, which shows a perspective view of a roller rail that is denoted as a whole by the reference character 10. The roller rail 10 comprises a longitudinal beam 12, which takes the form of a hollow section with a rectangular cross section. In the longitudinal beam 12 two driven rollers 14 and two non-driven rollers 16 are arranged alternately in longitudinal direction. The driven rollers 14 are unprofiled and carry a high-friction coating. The non-driven rollers 16 have a profile with wheel flanges on both sides. The wheel flanges effect lateral guidance of the runners of the skids to be transported.

Associated with each of the driven rollers 14 is a separate electric hub drive motor, which with the rollers 14 forms in each case a compact drive module and is not itself visible in the drawing.

Figure 2:
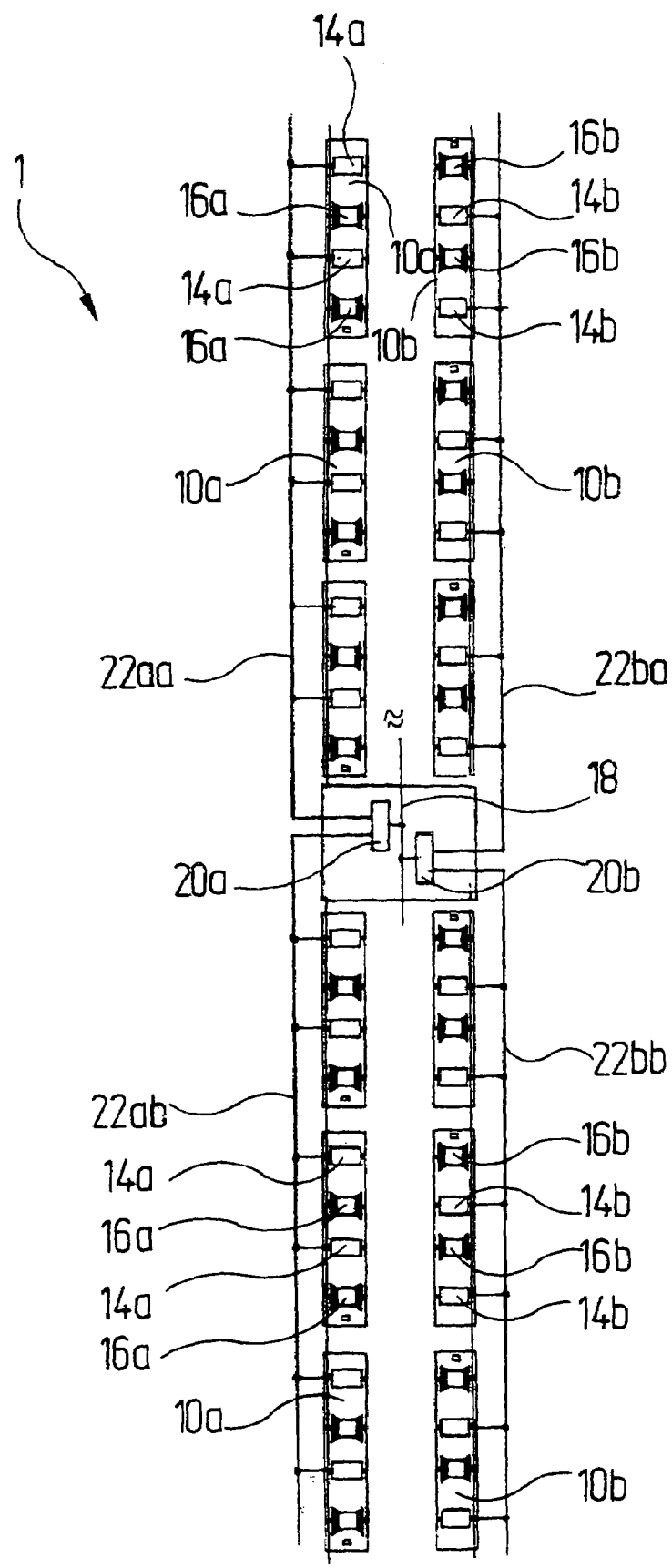
FIG. 2 is a plan view—with partial electric cabling—showing a first embodiment of the roller conveyor of the present invention; and, FIG. 3 is a plan view—with partial electric cabling—showing a second embodiment of a roller conveyor of the present invention.

As may be seen from FIG. 2, a roller conveyor 1 is composed of a plurality of roller rails 10 of the type illustrated in FIG. 1 by arranging these roller rails 10 into two parallel rows or "tracks". The distance between the two tracks of roller rails 10 corresponds to the distance between the runners of the skids that are to be conveyed along the roller conveyor 1.

The driven rollers 14 of the various roller rails 10 are supplied with electrical energy in the following manner:

A line carrying the system voltage available at the site of installation of the roller conveyor is provided in FIG. 2 with the reference character 18. Two direct voltage supply devices 20a, 20b are connected to the supply line 18 and generate at in each case two outputs a low direct voltage of for example 24 V. One of these direct voltage supply devices 20a supplies all of the driven rollers 14a in one of the two tracks of the roller conveyor 1, while the other of the two direct voltage supply devices 20b supplies the driven rollers 14b of the second track.

The one output of the direct voltage supply device 20a is connected by a line 22a a to all of the driven rollers 14a that are situated, viewed from the direction of the direct voltage supply devices 20a, 20b, on one side thereof, while the second output of the direct voltage supply device 20a is connected by a line 22ab to all of the driven rollers 14a that are situated on the opposite side of the direct voltage supply devices 20a, 20b.

In a corresponding manner, one of the two outputs of the direct voltage supply device 20b is connected by a line 22ba to all of the driven rollers 14b of the second track of the roller conveyor 1 that are situated, viewed from the direction of the direct voltage supply devices 20a, 20b, on one side thereof, while the second output of the direct voltage supply device 20b via a line 22bb supplies all of the driven rollers 14b of the, in FIG. 2, right track that are situated on the opposite side of the direct voltage supply devices 20a, 20b.

The use of hub drive motors operated with a low voltage offers a whole range of advantages:

The foremost of these is the fact that the safety requirements are then considerably lower than would be the case with drive technology operating with full system voltage. This leads to savings in terms of installation technology. Furthermore, the semiconductor components that are used in the direct voltage supply devices 20a, 20b and in the control components of the driven rollers 14 are considerably less expensive. The printed conductors on the printed-circuit boards, for the prevention of voltage flashovers, do not have to maintain such large safety distances from one another, with the result that the printed-circuit boards themselves are reduced in size and may be integrated without difficulty e.g. into a compact drive module with driven roller 14 and corresponding control components. The driven rollers 14 may be used in a braking operation as generators, with the result that electrical energy may be saved. Finally, lower losses occur in low voltage circuit components, with the result that once more an energy-saving effect arises and only small cooling surfaces are required.

As the direct voltage supply devices 20a, 20b are provided in duplicate, the roller conveyor 1 has an "emergency operation property" for the eventuality of a fault occurring in one of the two drive trains that are supplied by the direct voltage supply devices 20a, 20b. The respective intact "drive train" may then perform the entire drive function for a specific time, albeit at the cost of specific cutbacks in acceleration and speed.

Figure 3:
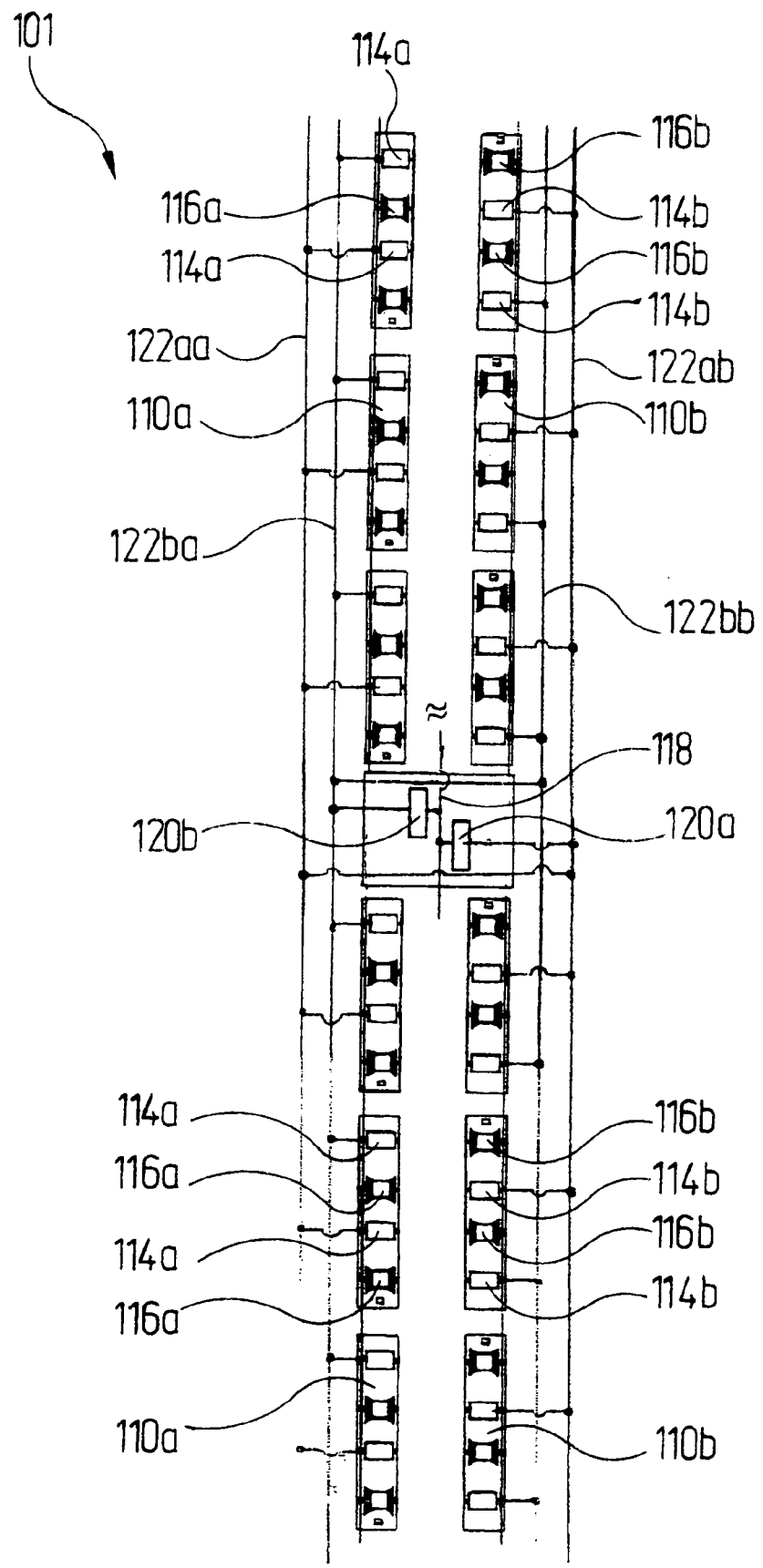

The embodiment of a roller conveyor 101 illustrated in FIG. 3 is very similar to the embodiment described above with reference to FIG. 2. Corresponding parts are therefore denoted by the same reference characters plus 100.

The roller conveyor 101 of FIG. 3 is also composed of a plurality of roller rails 110, of the type illustrated in FIG. 1. To this extent, the mechanical construction of the embodiment of FIG. 3 is no different from that of FIG. 2. However, the various driven rollers 114a, 114b in the two tracks of the roller conveyor 101 are supplied in a different manner.

As may be seen from FIG. 3, along both tracks of the roller conveyor 101 of FIG. 3 there extend two lines 122aa, 122ba and 122ab, 122bb respectively, which carry a low direct voltage. The supply lines 122aa and 122ab are both connected to one of the two direct voltage supply devices 120a, while the two supply lines 122ba and 122bb are connected to the second direct voltage supply device 120b.

As FIG. 3 reveals, all of the driven rollers 114a of the left track of the roller conveyor 101 are connected alternately, on the one hand, to the supply line 122aa and, on the other hand, to the supply line 122ba. The result of this is that in each of the roller rails 110 there is in each case one driven roller 114 that is supplied from the one direct voltage supply device 120a and one driven roller 114 that is supplied from the other direct voltage supply device 120b.

The conditions in the, in FIG. 3, right track of the roller conveyor 101 are similar. Here too, the driven rollers 114 are connected alternately to the line 122ab and the line 122bb, ultimately therefore alternately to the direct voltage supply device 120a and the direct voltage supply device 120b.

In the embodiment of the roller conveyor 101 in FIG. 3, in the event of failure of one of the electric "drive trains", for example one of the two direct voltage supply devices 120a, 120b, then as in the embodiment of FIG. 2 an emergency operation of the roller conveyor 101 is possible. However, whereas in the embodiment of FIG. 2 there are driving forces exclusively in one track of the roller conveyor 1, in the embodiment of FIG. 3 even in the event of failure of one "drive train" there are still driven rollers 114 in both tracks. This promotes the directional stability of the skids during emergency operation.

Control of the various driven rollers 14, 114 is effected via an industry-standard bus system.

It should be emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the scope of this disclosure and the present invention, and protected by the following claims.

The invention claimed is:
1. A roller conveyor comprising:
a plurality of driven rollers and non-driven rollers disposed in two parallel tracks;
a plurality of drive motors for driving the driven rollers;

wherein the driven rollers and the non-driven rollers in one track are arranged alternately in longitudinal direction,
wherein a driven roller in one track corresponds to a non-driven roller in the other track with respect to the longitudinal direction;
at least one voltage source, from which the drive motors are supplied; wherein
with each driven roller a drive motor is associated;
the drive motors take the form of low voltage motors; and,
the at least one voltage source takes the form of a low voltage source.

2. The roller conveyor of claim 1, wherein the low voltage source supplies a voltage of at most 60 V.

3. The roller conveyor of claim 2, wherein the low voltage source supplies a voltage of approximately 48 V.

4. The roller conveyor of claim 2, wherein the low voltage source supplies a voltage of approximately 24 V.

5. The roller conveyor of claim 1, wherein the low voltage motors are d.c. motors and the low voltage source is a direct current source.

6. The roller conveyor of claim 2, wherein the low voltage motors are d.c. motors and the low voltage source is a direct current source.

7. The roller conveyor of claim 3, wherein the low voltage motors are d.c. motors and the low voltage source is a direct current source.

8. The roller conveyor of claim 4, wherein the low voltage motors are d.c. motors and the low voltage source is a direct current source.

9. The roller conveyor of claim 1, wherein the low voltage motors are hub motors, which with the driven rollers form a sub-assembly.

10. The roller conveyor of claim 2, wherein the low voltage motors are hub motors, which with the driven rollers form a sub-assembly.

11. The roller conveyor of claim 3, wherein the low voltage motors are hub motors, which with the driven rollers form a sub-assembly.

12. The roller conveyor of claim 4, wherein the low voltage motors are hub motors, which with the driven rollers form a sub-assembly.

13. The roller conveyor of claim 5, wherein the low voltage motors are hub motors, which with the driven rollers form a sub-assembly.

14. The roller conveyor of claim 6, wherein the low voltage motors are hub motors, which with the driven rollers form a sub-assembly.

15. The roller conveyor of claim 7, wherein the low voltage motors are hub motors, which with the driven rollers form a sub-assembly.

16. The roller conveyor of claim 8, wherein the low voltage motors are hub motors, which with the driven rollers form a sub-assembly.

* * * * *